(12) United States Patent
Galliers

(10) Patent No.: US 8,935,831 B2
(45) Date of Patent: Jan. 20, 2015

(54) WIRE BUCKLE STRAP FASTENER

(76) Inventor: Gary E. Galliers, The Villages, FL (US)

( * ) Notice: Subject to any disclaimer, the term of this patent is extended or adjusted under 35 U.S.C. 154(b) by 246 days.

(21) Appl. No.: 13/561,073

(22) Filed: Jul. 29, 2012

(65) Prior Publication Data

US 2014/0026374 A1 Jan. 30, 2014

(51) Int. Cl.
*A44B 11/00* (2006.01)
*B65D 63/16* (2006.01)

(52) U.S. Cl.
USPC .................... 24/16 R; 24/26; 24/200; 24/308

(58) Field of Classification Search
USPC .......... 24/16 R, 17 R, 18, 17 A, 19, 200, 308, 24/546, 548, 551, 570, 545, 530, 68 F
See application file for complete search history.

(56) References Cited

U.S. PATENT DOCUMENTS

| | | | |
|---|---|---|---|
| 733,950 | A | 7/1903 | Eddleman |
| 787,335 | A | 4/1905 | Lambert |
| 1,012,402 | A | 12/1911 | McFarland |
| 3,014,256 | A | 5/1961 | Derrickson et al. |
| 3,112,543 | A | 12/1963 | Derrickson |
| 3,349,444 | A | 10/1967 | Beach |
| 3,377,666 | A | 4/1968 | Sherman |
| 3,624,868 | A | 12/1971 | Somann |
| 3,663,995 | A | 5/1972 | Somann |
| 3,846,875 | A | 11/1974 | Catlos et al. |
| 3,924,302 | A | 12/1975 | Somann |
| 4,083,088 | A | 4/1978 | Somann |
| 2012/0000039 | A1 | 1/2012 | Stockham et al. |

FOREIGN PATENT DOCUMENTS

| | | |
|---|---|---|
| CA | 1226722 | 9/1987 |
| CA | 2303693 | 7/2000 |
| CA | 2701818 | 11/2010 |
| EP | 1134165 | 9/2001 |
| GB | 637197 | 5/1950 |
| GB | 1249675 | 10/1971 |
| GB | 1515918 | 6/1978 |
| WO | 2010130033 | 11/2010 |

OTHER PUBLICATIONS

International Searching Authority, Form PCT/ISA/210, International Search Report for International Application No. PCT/US2013/052431, communication dated Dec. 5, 2013.
International Searching Authority, Form PCT/ISA/237, Written Opinion of the International Searching Authority for International Application No. PCT/US2013/052431, communication dated Dec. 5, 2013.

*Primary Examiner* — Jack W Lavinder
(74) *Attorney, Agent, or Firm* — Law Office of Steven R. Olsen, PLLC; Steven R. Olsen

(57) ABSTRACT

The invention relates generally to the field of fasteners used with flexible strapping to secure cargo. In embodiments of the invention, a wire buckle fastener includes a retention tab coupled to an inside shoulder of the buckle. The retention tab prevents the inside shoulder from being pulled through a base of the buckle when the buckle is in use. In alternative embodiments of the invention, the retention tab may be configured as a loop or an open curve.

3 Claims, 4 Drawing Sheets

WIRE BUCKLE STRAP FASTENER

FIELD OF INVENTION

The invention relates generally to the field of fasteners. In particular, but not by way of limitation, the invention relates to an improved wire buckle used with flexible strapping to secure cargo.

BACKGROUND

As used herein, flexible strapping (or webbing) refers to, for instance, rayon, nylon, polyester, polypropylene, or other flexible material in a flat strip format used to secure cargo. In the packing and shipping industries, flexible strapping is usually dispensed from rolls. Strapping widths of ½-1⅝ inches are typical. In use, flexible strapping is used to secure cargo, for example, by bundling multiple items together and/or by securing a load to a skid or truck bed.

Buckles are used to couple two ends of a single flexible strap, or to daisy chain two or more straps together. Such buckles are also typically configured to facilitate tensioning of the strap(s). One type of buckle is a wire buckle, so named because it is formed from a single piece of wire or rod. An advantage of wire buckles is that they are relatively inexpensive to manufacture. Conventional wire buckles have shortcomings when used with flexible strapping, however. For instance, known wire buckle configurations include irregular geometries and/or suffer from asymmetrical interference between different portions of the buckle (typically the shoulders) during use. As a consequence, conventional buckles deform under tension, placing uneven stresses on the flexible strapping being retained. Such uneven stresses can cause the flexible strapping to fray and, eventually, to fail.

Therefore, a need exists for an improved wire buckle that is less prone to distortion for use with flexible strapping.

SUMMARY OF THE INVENTION

Embodiments of the invention seek to overcome one or more of the limitations described above. To achieve such objectives, embodiments of the invention include a wire buckle with a retention tab coupled to an inside shoulder.

More specifically, embodiments of the invention provide a wire buckle that includes: a u-shaped base having a first, a second, and a third side in a first plane, the first side being connected to the second side, the second side being connected to the third side, the first and the third sides being substantially parallel, the second side being substantially perpendicular to the first side and the third side; an outer shoulder connected to the third side of the base; an inner shoulder connected to the first side of the base; a first arm connected to the outer shoulder; a second arm coupled to the inner shoulder; and a retention tab connected between the inner shoulder and the second arm, the first arm and the second arm being disposed in a second plane, a terminal end of the first arm and a terminal end of the second arm being disposed on the same side of the wire buckle, the wire buckle being configured such that the outer shoulder and the inner shoulder do not interfere with each other during use, the wire buckle being formed from a single piece of wire.

BRIEF DESCRIPTION OF THE DRAWINGS

Embodiments of the invention are described with reference to the following drawings, wherein.

DETAILED DESCRIPTION

Embodiments of the invention will now be described more fully with reference to FIGS. 1 through 13. The invention may, however, be embodied in many different forms and should not be construed as limited to the embodiments set forth herein. Rather, these embodiments are provided so this disclosure will enable a person having ordinary skill in the art to practice the claimed invention. In the figures, the same reference designators are used for the same or similar features.

Embodiments of the invention provide a buckle manufactured from a single piece of wire. As used herein, wire means wire-like: a rod of semi-rigid elastic material. But the wire buckle is preferably metal, and more preferably steel. The wire is preferably solid with a circular cross-section. The diameter of the wire is sized according to application requirements; for a given material, higher-tension applications may require buckles made from larger diameter wire. The wire may be formed into a buckle, for example, via known multi-slide wire forming processes. The invention is not so limited, however. Casting, forging, molding, tube bending, or other manufacturing processes could also be employed. A surface treatment may optionally be applied to the buckle (typically after forming) based on environmental, cosmetic, and/or other considerations. For instance, a steel wire buckle may be galvanized after forming to prevent rusting. Phosphates, black oxide, or other coatings may also be applied, according to application requirements.

The following paragraphs describe the shape and operational utility of a wire buckle according to three different embodiments of the invention: a first embodiment is described with reference to FIGS. 1-4; a second embodiment is described with reference to FIGS. 5-8; and a third embodiment is described with reference to FIGS. 9-12.

Figure 1:
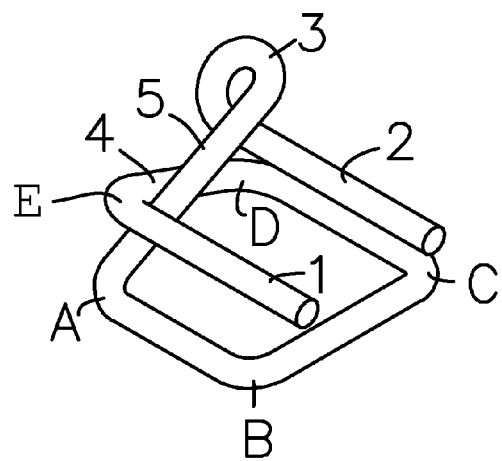
FIG. 1 is a perspective view of a wire buckle, according to a first embodiment of the invention.

FIG. 1 is a perspective view of a wire buckle, according to a first embodiment of the invention. As shown therein, a generally u-shaped base is defined by corners A, B, C, and D. Base portions disposed between corners A&B, B&C, and C&D are configured to be substantially planar. Arms 1 and 2 are sized to receive flexible strapping of a predetermined width as will be described in more detail below. The arms 1 and 2 are coupled to the base via shoulders 4 and 5, respectively. The shoulder 4 can be considered an outside shoulder; the shoulder 5 can be considered an inside shoulder.

A retention tab 3 is disposed in-line between the shoulder 5 and the arm 2. The purpose of the retention tab 3 is to support arm 2 so it cannot be pulled through the base when the wire buckle is in use. The retention tab 3 of the first embodiment is configured as a loop of approx. 270 degrees. As used herein, a loop is a portion of wire that crosses itself and resembles a closed curve when projected onto a two-dimensional plane.

Figure 2:
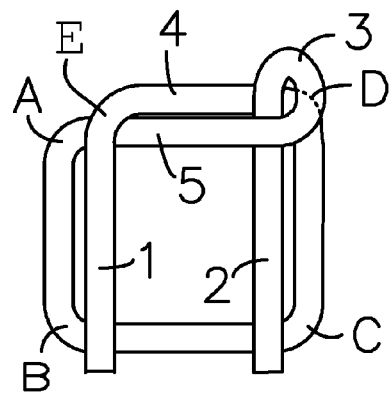
FIG. 2 is a top view of a wire buckle, according to the first embodiment of the invention.

FIG. 2 is a top view of a wire buckle, according to the first embodiment of the invention. FIG. 2 illustrated that the base portion disposed between corners A&B is substantially parallel to the base portion disposed between corners C&D. The base portion disposed between corners A&B is also substantially perpendicular to the base portion disposed between corners B&C. The shoulders 4 and 5 are essentially straight (i.e., they are free of bends except where they couple to other wire buckle features), and are substantially parallel to each other when viewed from above. The arms 1 and 2 are likewise substantially straight, substantially parallel to each other when viewed from above, and substantially parallel to the base portion disposed between corners A&B. Corners A, B, C, D, and E are approximately 90 degree bends (preferably within a few degrees to achieve the substantially parallel and substantially normal relationships just described). The wire buckle is configured such that, in operation, the shoulders 4 and 5 move in non-intersecting vertical planes. As used herein, substantially parallel and substantially perpendicular are relative terms meaning within a few degrees of 0 and 90 degrees, respectively.

Terminal ends of the arms 1 and 2 are disposed on the same side of the wire buckle to simplify threading of the flexible strapping. The terminal ends of the arms 1 and 2 extend slightly beyond the base portion disposed between corners B&C.

Figure 3:
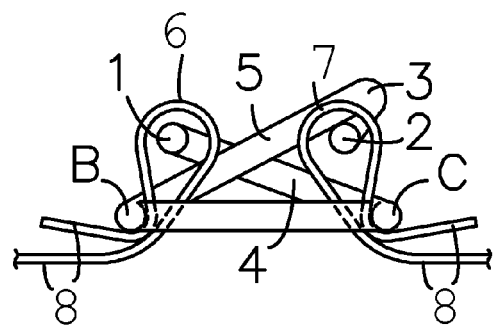
FIG. 3 is a side view of a wire buckle in an uncompressed state, according to the first embodiment of the invention.

FIG. 3 is a side view of a wire buckle in an uncompressed state, according to the first embodiment of the invention. As shown therein, in an uncompressed state, the arms 1 and 2 are elevated with respect to the base. This facilitates threading. FIG. 3 illustrates a single piece of flexible strapping 8 threaded onto the wire buckle. A first portion 6 of the flexible strapping 8 is threaded through the base and around the arm 1. A second portion 7 of the flexible strapping 8 is threaded through the base and around the arm 2.

Figure 4:
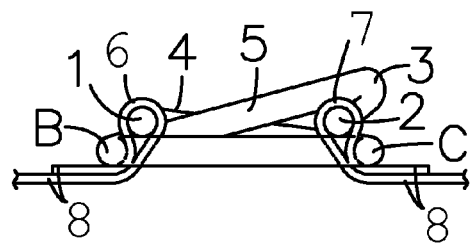
FIG. 4 is a side view of a wire buckle in a compressed state, according to the first embodiment of the invention.
Figure 5:
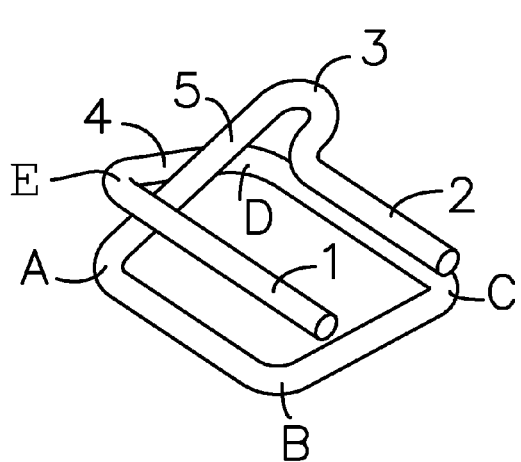
FIG. 5 is a perspective view of a wire buckle, according to a second embodiment of the invention.
Figure 6:
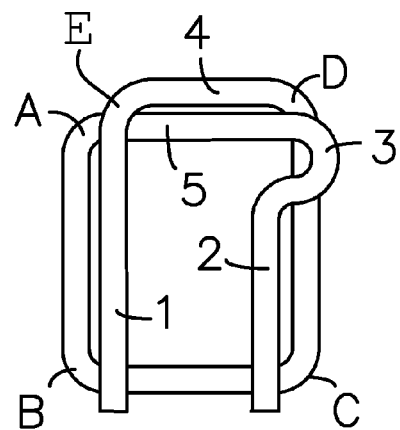
FIG. 6 is a top view of a wire buckle, according to the second embodiment of the invention.
Figure 7:
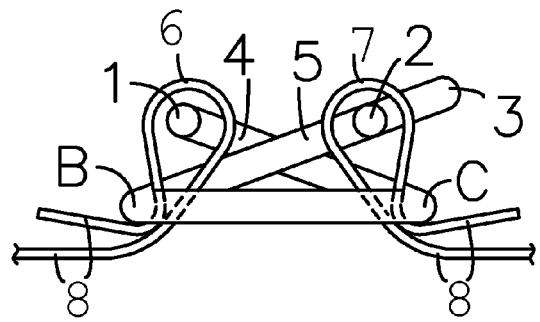
FIG. 7 is a side view of a wire buckle in an uncompressed state, according to the second embodiment of the invention.
Figure 8:
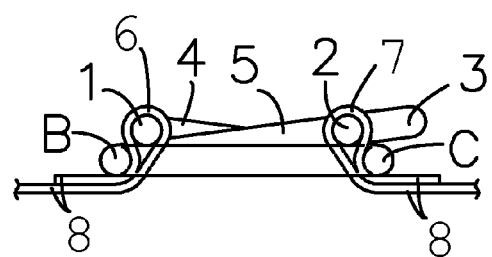
FIG. 8 is a side view of a wire buckle in a compressed state, according to the second embodiment of the invention.
Figure 9:
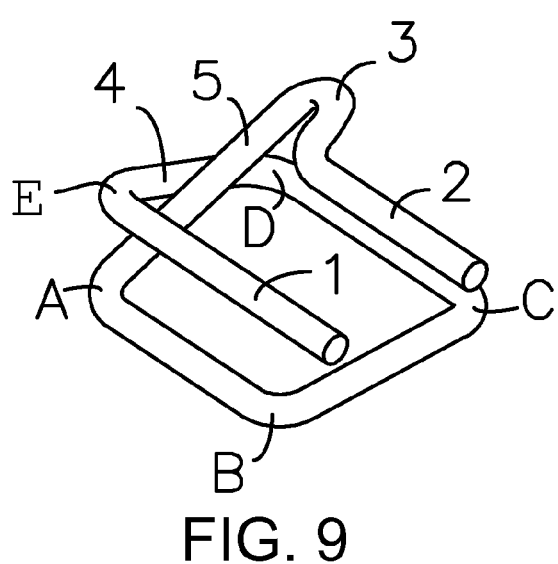
FIG. 9 is a perspective view of a wire buckle, according to a third embodiment of the invention.
Figure 10:
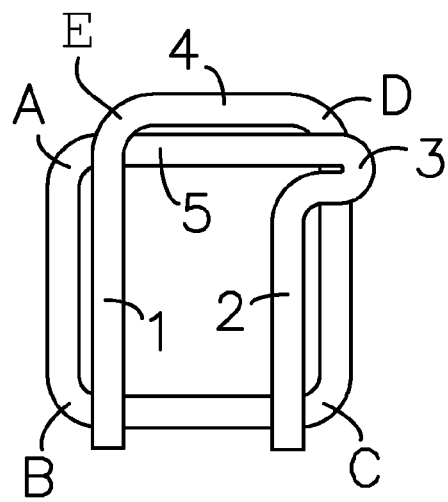
FIG. 10 is a top view of a wire buckle, according to the third embodiment of the invention.
Figure 11:
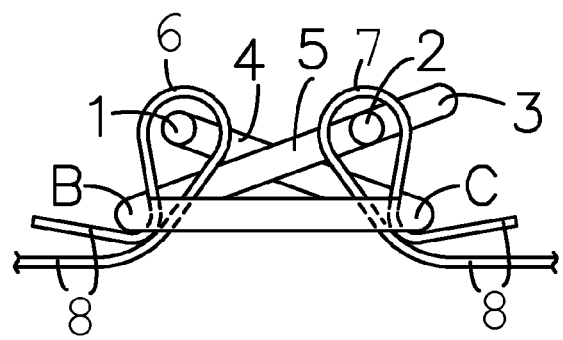
FIG. 11 is a side view of a wire buckle in an uncompressed state, according to the third embodiment of the invention.
Figure 12:
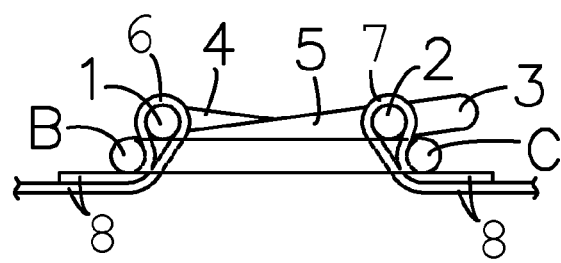
FIG. 12 is a side view of a wire buckle in a compressed state, according to the third embodiment of the invention.

FIG. 4 is a side view of a wire buckle in a compressed state, according to the first embodiment of the invention. In the illustrated compressed state, the wire buckle and the flexible strapping 8 are under tension. Near its terminal end, arm 1 interferes with the base. The other side of arm 1 is supported where corner E interferes with the shoulder 5. Near its terminal end, arm 2 also interferes with the base. The other side of the arm 2 is supported by the interference of the retention tab 3 and shoulder 4.

Accordingly, shoulders 4 and 5 are each configured to move freely and without interference from other wire buckle features until the wire buckle is fully compressed. At full compression, each of the arms 1 and 2 are uniformly supported at both ends.

The flexible strapping 8 is secured on a first side of the wire buckle by being frictionally held (cinched) between the arm 1 and portion of the base disposed between corners A&B. The flexible strapping 8 is secured on a second side of the wire buckle by being frictionally held (cinched) between the arm 2 and portion of the base disposed between corners C&D. Because the arms 1 and 2 are uniformly supported at both ends, the cinching forces applied to the flexible strapping 8 are also uniform, limiting the likelihood of fraying and failure.

One benefit of the first embodiment is the robust configuration of the retention tab 3. Another benefit of the first embodiment is the relatively long length of the arm 2 compared to alternative embodiments described below.

Variations to the first embodiment of the wire buckle illustrated in FIGS. 1-4 are possible. For instance, the rectangular footprint could be less square than shown. In addition, in an alternative embodiment, the retention tab 3 could be formed such that it interferes more directly with the corner D rather than the shoulder 4 when the wire buckle is compressed. Moreover, a mirror image of the first embodiment could be manufactured, according to design choice.

FIGS. 5-8 illustrate a second embodiment of the invention. The features are as described above with reference to the first embodiment except for differences associated with the retention tab 3. The retention tab 3 of the second embodiment is an open curve having relatively loose bend radii. The bend radii of the retention tab 3 may be, for instance, in the range of 0.5 to 2.0 times the diameter of the wire used to manufacture the wire buckle. Other bend radii may also be used. As most clearly shown in FIG. 6, the retention tab 3 of the second embodiment is configured to interfere with the portion of the base between corners C&D when the wire buckle is compressed. The wire buckle according to the second embodiment may be easier to manufacture than the wire buckle according to the first embodiment.

Variations to the second embodiment of the wire buckle illustrated in FIGS. 5-8 are possible. For instance, the rectangular footprint could be less square than shown. In addition, in an alternative embodiment, the retention tab 3 could be formed such that it interferes more directly with the corner D and/or the shoulder 4 rather than the portion of the base between corners C&D when the wire buckle is compressed. Moreover, a mirror image of the second embodiment could be manufactured, according to design choice.

FIGS. 9-12 illustrate a third embodiment of the invention. The features are as described above with reference to the first and second embodiments except for differences associated with the retention tab 3. The retention tab 3 of the third embodiment is an open curve having at least one relatively tight bend radius. One bend radius of the retention tab 3 may be, for instance, in the range of 0.01 to 0.1 times the diameter of the wire used to manufacture the wire buckle. Other bend radii may also be used. As most clearly shown in FIG. 10, the retention tab 3 of the third embodiment is configured to interfere with the portion of the base between corners C&D when the wire buckle is compressed. The wire buckle according to the third embodiment may be easier to manufacture than the wire buckle according to the first embodiment.

Variations to the third embodiment of the wire buckle illustrated in FIGS. 9-12 are possible. For instance, the rectangular footprint could be less square than shown. In addition, in an alternative embodiment, the retention tab 3 could be formed such that it interferes more directly with the corner D and/or the shoulder 4 rather than the portion of the base between corners C&D when the wire buckle is compressed. Moreover, a mirror image of the third embodiment could be manufactured, according to design choice.

Figure 13:
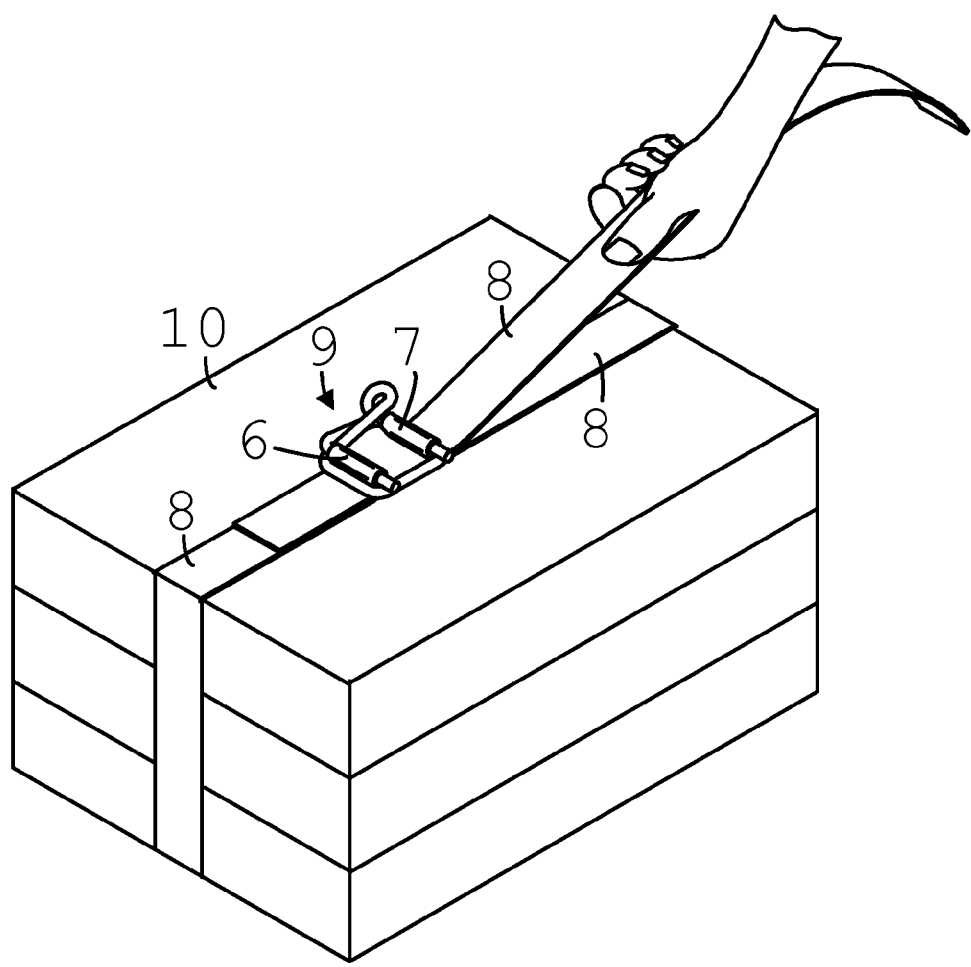
FIG. 13 is an illustration of a wire buckle in use, according to an embodiment of the invention.

FIG. 13 is an illustration of a wire buckle in use, according to an embodiment of the invention. As shown therein, flexible strapping 8 is wrapped around cargo 10. Portions 6 and 7 of flexible strapping 8 are threaded through a wire buckle 9. The buckle 9 retains the flexible strapping 8 and also facilitates tensioning. Although manual tensioning is illustrated in FIG. 13, persons skilled in the art will appreciate that a tensioning tool may be used as an alternative to, or in combination with, manual tensioning. The tensioning tool may be, for instance, manually or pneumatically operated. Even though the illustrated wire buckle 9 most closely reflects the first embodiment of the wire buckle described above, wire buckles according to the second and third embodiments, or other equivalent wire buckles, may be used in similar fashion.

Embodiments of the invention thus provide, among other things, a wire buckle for use with flexible strapping that minimizes distortion during compression. Such a buckle is advantageous because it reduces uneven stresses that can cause the flexible strapping to fail.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms.

I claim:

1. A wire buckle for use with flexible strapping, comprising:
   a u-shaped base having a first, a second, and a third side in a first plane, the first side being connected to the second side, the second side being connected to the third side, the first and the third sides being substantially parallel, the second side being substantially perpendicular to the first side and the third side;
   an outer shoulder connected to the third side of the base;
   an inner shoulder connected to the first side of the base;
   a first arm connected to the outer shoulder;
   a second arm coupled to the inner shoulder; and
   a retention tab connected between the inner shoulder and the second arm, the first arm and the second arm being disposed in a second plane, a terminal end of the first arm and a terminal end of the second arm being disposed on the same side of the wire buckle, the wire buckle being configured such that the outer shoulder and the inner shoulder do not directly interfere with each other during use, the wire buckle being formed from a single piece of wire, the retention tab not being interlocked with any other portion of the wire buckle, wherein the retention tab is configured as a loop that will interfere with the outer shoulder only when the wire buckle is fully compressed, and wherein the loop has a bend of approximately 270 degrees.

2. A wire buckle for use with flexible strapping, comprising:
   a u-shaped base having a first, a second, and a third side in a first plane, the first side being connected to the second side, the second side being connected to the third side, the first and the third sides being substantially parallel, the second side being substantially perpendicular to the first side and the third side;
   an outer shoulder connected to the third side of the base;
   an inner shoulder connected to the first side of the base;
   a first arm connected to the outer shoulder;
   a second arm coupled to the inner shoulder; and
   a retention tab connected between the inner shoulder and the second arm, the first arm and the second arm being disposed in a second plane, a terminal end of the first arm and a terminal end of the second arm being disposed on the same side of the wire buckle, the wire buckle being configured such that the outer shoulder and the inner shoulder do not directly interfere with each other during use, the wire buckle being formed from a single piece of wire, the retention tab not being interlocked with any other portion of the wire buckle, wherein the retention tab is an open curve, the retention tab being configured to interfere with the third side of the base only when the wire buckle is fully compressed.

3. A wire buckle for use with flexible strapping, comprising:
   a u-shaped base having a first, a second, and a third side in a first plane, the first side being connected to the second side, the second side being connected to the third side, the first and the third sides being substantially parallel, the second side being substantially perpendicular to the first side and the third side;
   an outer shoulder connected to the third side of the base;
   an inner shoulder connected to the first side of the base;
   a first arm connected to the outer shoulder;
   a second arm coupled to the inner shoulder; and
   a retention tab connected between the inner shoulder and the second arm, the first arm and the second arm being disposed in a second plane, a terminal end of the first arm and a terminal end of the second arm being disposed on the same side of the wire buckle, the wire buckle being configured such that the outer shoulder and the inner shoulder do not directly interfere with each other during use, the wire buckle being formed from a single piece of wire, the retention tab not being interlocked with any other portion of the wire buckle, wherein the retention tab is an open curve, the retention tab being configured to interfere with an intersection of the third side of the base and the outer shoulder only when the wire buckle is fully compressed.

* * * * *